April 28, 1964 J. ENSINK ETAL 3,131,352
TRANSMITTING DEVICE
Filed Nov. 14, 1960
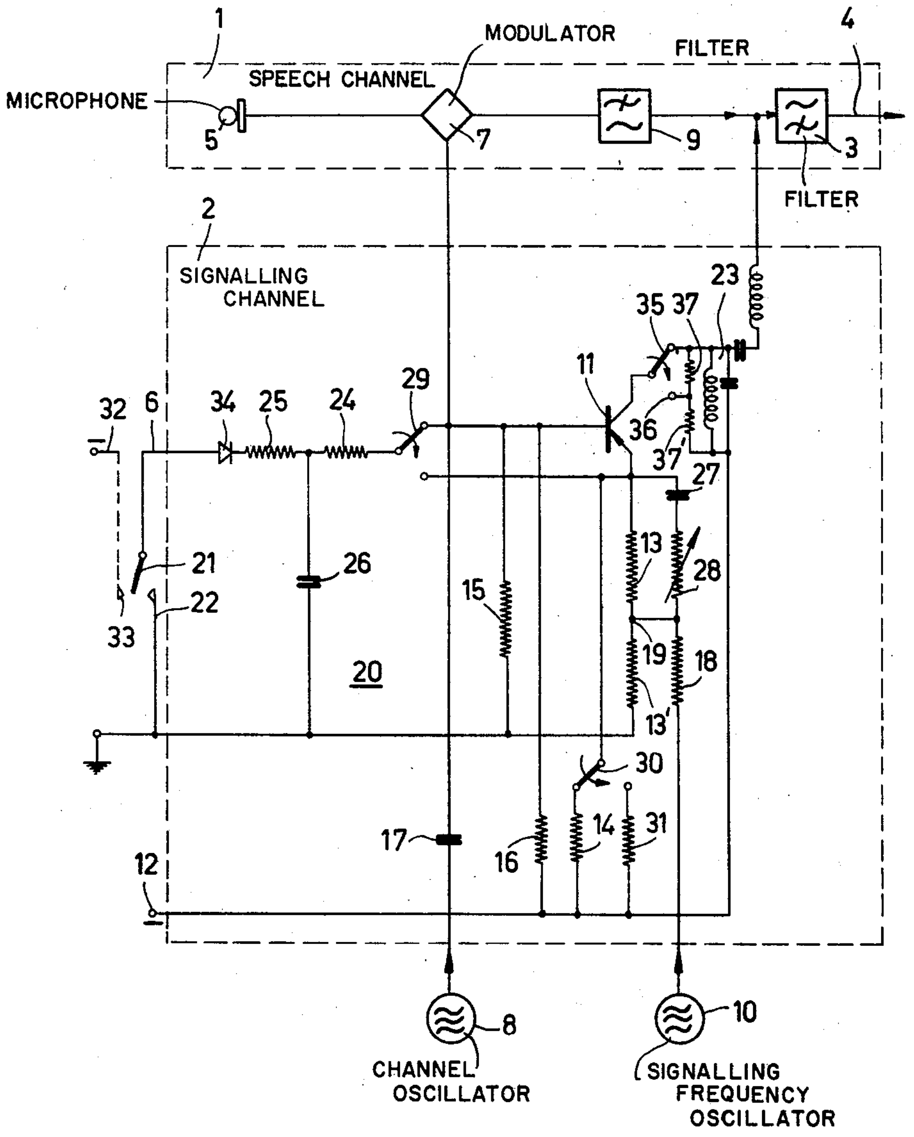
INVENTORS
JOHANNES ENSINK
WILLEM BEIJNINK
BY
AGENT United States Patent Office 3,131,352

Patented Apr. 28, 1964

3,131,352

TRANSMITTING DEVICE

Johannes Ensink and Willem Beijnink, Hilversum, Netherlands, assignors to North American Philips Company, Inc., New York, N.Y., a corporation of Delaware Filed Nov. 14, 1960, Ser. No. 69,182

Claims priority, application Netherlands Dec. 24, 1959

7 Claims. (Cl. 325—64)

The invention relates to a transmitting device comprising a speech channel with a modulator for modulating a speech signal on a speech carrier frequency and a signalling channel having a signalling generator controlled by a signalling switch. The speech carrier frequency and the signalling carrier frequency are applied as input signals to the signalling generators for providing a signalling transmission on a signalling carrier/frequency. This latter frequency differs from the speech carrier frequency by the signalling frequency. The device according to the invention may be used with particular advantage for carrier-frequency telephone transmission.

With carrier frequency telephone transmission various transmitting methods are used for signalling transmission. With so-called pulse signalling for example signalling pulses are emitted during the dialling period, and both in the busy state and in the free state the signalling carrier frequency is suppressed. In contradistinction to pulse signalling are the continuous signalling transmission methods, in which apart from the transmission of the signalling pulses during the selection period in the continuous signalling method on the basis of the tone-idle signalling principle, in the non-busy state of the carrier frequency telephone channel the signalling carrier frequency is emitted and suppressed in the busy state. In the signalling method on the basis of the tone-busy signalling principle the signalling carrier frequency is emitted in the busy state and suppressed in the free state. With these signalling transmission methods the level of the signalling carrier frequency is chosen differently. Thus, with the pulse signalling transmission method the level of the signalling carrier frequency may be, for example, 1 mw.–6 db at a relative zero level and with the continuous signalling transmission methods for example the level may be 1 mw.–18 db at a point of relative zero level.

In this case the signalling generator should match, in its structure, the structure of the automatic telephone exchange co-operating in the carrier frequency telephone system. The exchange comprises the signalling switch. The automatic telephone exchange may, for example, be arranged so that in the free state the signalling switch is connected to earth and, in the busy state, it is open. Conversely, with other automatic telephone exchanges the signalling switch is open in the free state and is connected to earth in the busy state. In accordance with the structure of the automatic telephone exchange and the signalling transmission method required in the carrier frequency telephone system the signalling generator has to emit or to suppress the signalling carrier frequency when the signalling switch is closed.

Apart from this arrangement of automatic telephone exchanges, in which the signalling circuit leading to the carrier frequency telephone system is connected to earth by the signalling switch or is interrupted, automatic telephone exchanges are also used in practice in which the signalling circuit is connected to earth or to a negative voltage.

The invention has for its object to provide a transmitting device of the kind set forth, comprising a signalling generator which can be made universally employable in a simple manner for the method of signalling transmission in the various embodiments of the automatic telephone exchanges, and its structure is technically attractive.

The device according to the invention is characterized in that the signalling generator comprises a transistor, the input signals being fed respectively to the emitter electrode and the base electrode thereof. These electrodes are connected each to a fixed bias voltage source by means of an individual voltage divider, one of which voltage dividers being connected to the signalling switch via a circuit impedance allowing direct current to pass the output voltage of the signalling generator being obtained from a selection filter included in the collector circuit.

The invention and its advantages will now be described more fully with reference to the figure, which illustrates a carrier frequency transmitting system according to the invention.

The carrier-frequency telephone transmitting channel shown in the figure according to the invention forms part of a carrier frequency telephone system in which each carrier frequency telephone transmitting channel has a bandwidth of 4 kc./s. for the transmission of speech signals and signalling signals.

The carrier frequency telephone transmitting channel is designed, for example, for the transmission of speech signals and signalling signals in the band from 20 to 24 kc./s. and is provided with a speech channel 1 and a signalling channel 2, the output circuits of the speech channel 1 and of the signalling channel 2 being connected via a high bandpass filter 3 to an output conductor 4. In the speech channel 1 the speech signals emanating from a microphone 5 are modulated in the modulator 7 on a speech carrier frequency of 20 kc./s., supplied by a channel oscillator 8, the upper sideband lying in the frequency band from 20.3 to 23.4 kc./s. being selected and emitted via the conductor 4 by a single-sideband filter formed by a low-bandpass filter 9 having a limit frequency of 23.4 kc./s. and the high-bandpass filter 3 having a limit frequency of 20.3 kc./s. The signalling channel 2 comprises a signalling generator, to which the speech carrier frequency of 20 kc./s. and the signalling frequency of 3.825 kc./s. emanating from a signalling frequency oscillator 10 are fed as input signals for the transmission of signalling signals on a signalling carrier frequency of 23.825 kc./s., which differs, consequently, from the speech carrier frequency of 20 kc./s. by the signalling frequency of 3.825 kc./s. In the frequency band of 20 to 24 kc./s. used for the carrier frequency telephone transmitting channel shown, the band from 20.3 to 23.4 kc./s. is employed for the transmission of speech signals, whereas the signalling signals are emitted on the signalling carrier frequency of 23.825 kc./s.

According to the invention, a particularly advantageous signalling generator may comprise a transistor 11, in which the emitter electrode and the base electrode are connected to a fixed bias voltage each by a voltage divider 13, 13', 14 and 15, 16 respectively, connected between earth and the negative terminal 12 of the supply source. The speech carrier of the channel oscillator 8 is fed via a separation capacitor 17 to the base electrode of the transistor 11 and the signalling frequency oscillator 10 is connected via a series resistor 18 to a tapping 19 of the voltage-divider resistor 13, 13' included in the emitter circuit. The output voltage of the signalling generator 11 is derived from a selection filter 23, included in the collector circuit. To the voltage divider 15, 16 is connected a circuit impedance 20, which allows direct current to pass and which is connected via a signalling conductor 6 to a signalling switch 21, provided in an automatic telephone exchange. This signalling switch 21 may be connected to earth via a switching contact 22. The circuit impedance 20 is formed by a T-network which is formed by the series combination of two resistors 24, 25 and a parallel capacitor 26, connected to the junction of the resistors 24, 25. The switching impedance 20 producing a suitable flank levelling. Instead of using the two series resistors 24, 25 of the circuit impedance 20, the series combination of two inductors may be employed.

The operation of the device shown will now be explained more fully.

When the switch 21 is open, the transistor 11 of the device described so far is connected approximately for class B operation by the voltage dividers 13, 13', 14 and 15, 16. By mixing the signalling frequency of 3.825 kc./s. with the speech carrier frequency of 20 kc./s., the signalling carrier frequency of 23.825 kc./s. is produced in the transistor 11. This latter carrier frequency is selected in the selection filter 23 and emitted via the channel filter 3 through the output conductor 4.

If the switch 21 is connected to earth via the contact 22, the circuit impedance 20, allowing direct current to pass, is connected in parallel with the resistor 15 of the voltage divider 15, 16, connected to the base electrode, so that the base bias voltage of the transistor 11 in accordance with the time constant of the circuit impedance 20, will vary gradually in a positive sense. As a result, the transistor 11 is brought into the blocked condition, in which no oscillations are any longer transmitted to the output conductor 4.

If the switch 21 is reopened, the base bias voltage of the transistor 11, in accordance with the time constant of the circuit impedance 20, will gradually return to its initial value, and the signalling carrier frequency of 23.825 kc./s. will again be emitted via the conductor 4. When the switch 21 is actuated, a transmission of signalling signals on the signalling carrier frequency of 23.825 kc./s. is then obtained. The circuit impedance 20 brings about a suitable flank levelling, so that high harmonics are suppressed in the spectrum of the signalling signals, so that they cannot penetrate into the speech band from 20.3 to 23.4 kc./s. or into the adjacent channel.

The transistor 11 operates in this case as a mixing stage for the speech carrier frequency of 20 kc./s. and the signalling frequency of 3.825 kc./s. and simultaneously as a switching stage, which is substantially independent of a variation in the transistor properties. The voltage divider 13, 13' in the emitter circuit constitutes a virtual direct-current negative feed-back for the transistor 11, so that the amplitude of the signalling carrier frequency produced in the transistor 11 of 23.825 kc./s. is substantially not affected by the properties of the transistor 11. For the adjustment of the amplitude of the signalling carrier frequency of 23.825 kc./s. without an effect on the negative direct-current feed-back, a series combination of a separation capacitor 27 and an adjustable resistor 28 is connected between the emitter electrode and the junction 19 of the signalling frequency oscillator 10 to the emitter resistor 13, 13'. The amplitude of the signalling frequency of the emitter electrode of the transistor 11 and hence also the amplitude of the signalling carrier frequency are adjusted by means of the resistor 28.

Apart from a simple structure and independence of the variation in the properties of the transistor 11, the signalling generator 11 has, especially for use in carrier frequency telephony, a further important advantage in that, when the switch 21 is actuated, a minimum reaction on the channel oscillator 8 and the signalling frequency oscillator 10 is ensured. The channel oscillator 8, owing to the very high input impedance of the transistor 11 fed back in the emitter circuit, is not substantially loaded by the transistor 11. When the switch 21 is actuated, the oscillator 8 does not experience a varying load, since the parallel capacitor 26 connected between the resistors 24 and 25 of the circuit impedance 20 constitutes a short-circuit for the speech carrier frequency of 20 kc./s. The reaction is minimized with respect to the signalling frequency oscillator 10 by connecting this oscillator 10 via the series resistor 18 to the junction 19 of the emitter resistor 13, 13'. Without the risk of cross-talk these oscillators 8 and 10 may find a multiple use. For example the oscillator 10 may be used for simultaneously feeding a plurality of signalling generators.

As stated above, the embodiment of the signalling generator described above is suitable for signalling transmission, in which, when the switch 21 is open, the signalling carrier frequency is to be emitted and in the closed state of the switch, is to be suppressed. For example, with continuous signalling according to the tone-idle signalling principle, when in the automatic telephone exchange the closed condition of the signalling switch 21 marks the busy state or for continuous signalling according to the tone-busy signalling principle in the automatic telephone exchange, the closed condition of the signalling switch marks the free state.

It may be desired, on the contrary, that the signalling carrier frequency should be transmitted when the switch 21 is closed, and suppressed when the switch is open (for example for continuous signalling according to the tone-idle signalling principle). In this case, if in the automatic telephone exchange the closed state of the signalling switch 21 characterizes the free state or for continuous signalling according to the tone-busy signalling principle, and the closed state of the signalling switch 21 marks the busy condition, the objects may be attained in a simple manner, while the said advantages are maintained, by connecting the circuit impedance 20 by means of a switch 29 to the emitter circuit of the transistor 11 and by connecting the voltage divider resistor 13, 13', included in the emitter circuit of the transistor 11, by means of a switch 30 to a resistor 31, connected to the negative terminal 12.

When the switch 21 is open, the transistor 11 in this device is blocked and when the switch 21 is closed it is connected for class B operation. The transition of the transistor 11 to the class B connection and conversely takes place gradually in accordance with the time constant of the circuit impedance 20. In the same manner as stated above, a signalling transmission on the signalling carrier frequency of 23.825 kc./s. is obtained, when the switch 21 is actuated, under the condition that, when the switch 21 is open, the signalling carrier frequency is suppressed and when the switch 21 is closed, it is emitted.

When the switches 29 and 30 are switched over, the advantages of the signalling generator are fully maintained; particularly by connecting the circuit impedance 20 by means of the switch 29 to the emitter circuit of the transistor 11 no varying load for the oscillator 10 is introduced, since the parallel capacitor 26 connected between the resistors 24 and 25 of the circuit impedance 20 constitutes a short-circuit also for the signalling frequency of 3.825 kc./s.

The signalling generator shown may be used, without the need for further means, both for pulse signalling and for continuous transmission methods. This object is attained in a simple manner by connecting the collector of the transistor 11 via a switch 35 directly to the selection filter 23 or to a tapping 36 of a resistor 37, 37', connected in parallel with the selection filter 23. With a direct connection of the switch 35 to the selection filter 23 the level of the signalling carrier frequency, with a suitable adjustment of the variable resistor 28, has the value desired for pulse signalling of, for example 1 mw.–6 db at a point of relative zero level, whereas with a connection of the switch 35 to the tapping 36 the level of the signalling carrier frequency has the desired value for continuous signalling of, for example, 1 mw.–18 db, at a point of relative zero level.

In the above-described embodiments of carrier frequency telephone exchanges, the signalling conductor 6 is connected to earth by means of the signalling switch 21 via a circuit contact 22, or is interrupted. The signalling generator of the invention may also be used in automatic telephone exchanges in which the signalling conductor 6 is connected between earth and a negative voltage via the signalling switch 21. The negative voltage is fed via the conductor 32, shown in broken lines, to a switching contact 33, which together with the contact 22 constitutes a change-over contact.

Between the circuit impedance 20 and the switch 21 is connected, to this end, a diode 34 having a pass direction as indicated in the figure, which ensures that in the contact position in which the switch 21 is connected to the contact 33, the diode 34 is blocked by the negative voltage of the conductor 32, so that it constitutes an interruption. In the contact position in which the switch 21 is connected to the switching contact 22, the diode 34 is released and the circuit impedance 20 is connected to earth via the contact 21, so that a working point displacement of the transistor 11 is obtained. If the switch 21 is actuated between the two contacts 22 and 33, a signalling transmission will be obtained, in the manner as described above, on the signalling carrier frequency of 23.825 kc./s. It should be noted here that the diode 34 constitutes a fixed part of the circuit impedance 20, even if the signalling generator 11 shown is used in conjunction with automatic telephone exchanges in which the signalling conductor 6 is connected to earth or interrupted via the signalling switch 21, since, as stated above, when the signalling switch 21 is connected to earth the diode 34 is conductive and thus constitutes a short-circuit.

In this manner the use of the measures according to the invention provides a signalling generator which is universally employable in a simple manner for the present signalling transmission methods and in the present carrier frequency telephone exchanges and which, as stated above, is distinguished by its advantages.

With a practically tested embodiment of a signalling generator of the type described above the following components were employed:

| | |
|---|---|
| Transistor 11 | OC71. |
| Resistor 13 | 8.2 kOhms. |
| Resistor 13' | 3 kOhms. |
| Resistor 14 | 5.1 kOhms. |
| Resistor 15 | 10 kOhms. |
| Resistor 16 | 9.1 kOhms. |
| Resistor 18 | 3 kOhms. |
| Capacitor 27 | 0.15 μF. |
| Resistor 28 | 5.1 kOhms at a maximum. |
| Resistor 31 | 10 kOhms. |
| Resistor 24 | 5.1 kOhms. |
| Resistor 25 | 7.5 kOhms. |
| Capacitor 26 | 0.32 μF. |
| Resistor 37 | 15 kOhms. |
| Resistor 37' | 5.1 kOhms. |

What is claimed is:

1. A carrier frequency telephone transmitting system comprising a source of speech signals, a source of carrier oscillations, a source of signalling oscillations, means for modulating said carrier oscillations with said speech signals, signalling generator means for modulating said carrier oscillations with said signalling oscillations, and means for combining the speech signal modulated carrier oscillations and the signalling oscillation modulated carrier oscillations to provide an output signal, said signalling generator comprising a transistor having first and second input electrodes and a collector electrode, a source of bias voltage having one terminal connected to a reference point and a second terminal, first and second resistive voltage dividers each connected between said first and second terminals and having first and second taps respectively connected to said first and second input terminals respectively, means applying said signalling oscillations to said second input electrode, means applying said carrier oscillations to said first input electrode, output filter means connected to said collector electrode for deriving said signalling oscillation modulated carrier oscillations, signalling switch means, and means connecting said switch means between said reference point and one of said input electrodes whereby in one position of said switch means said transistor is provided with bias for class B operation and in the other position of said switch means said transistor is cut off.

2. A carrier frequency telephone transmitting system comprising a source of speech signals, a source of carrier oscillations, a source of signalling oscillations, means for modulating said carrier oscillations with said speech signals, signalling generator means for modulating said carrier oscillations with said signalling oscillations, and means for combining the speech signal modulated carrier oscillations and the signalling oscillation modulated carrier oscillations to provide an output signal, said signalling generator comprising a transistor having emitter, base and collector electrodes, a source of bias voltage having a first terminal connected to a reference point and a second terminal, first resistive voltage divider means connected between said first and second terminals and having a first tap connected to said base electrode, second resistive voltage divider means connected between said first and second terminals and having a second tap connected to said emitter electrode, means for applying said signalling oscillations to said emitter electrode, means for applying said carrier oscillations to said base electrode, output filter circuit means connected to said collector electrode, and impedance means and signalling switch means serially connected between said reference point and one of said first and second taps whereby in one position of said switch said transistor is provided with bias for class B operation and in the other position of said switch said transistor is cut off.

3. The system of claim 2, in which said impedance means comprises first and second serially-connected resistors connected between one end of said switch and said one tap, and capacitor means connected between the junction of said first and second resistor and said reference point.

4. The system of claim 2, in which said switch means has a common contact, a first fixed contact connected to said reference point, and a second fixed contact connected to a source of negative potential, comprising diode means having an anode electrode connected to said common contact, and a cathode electrode, said impedance means being connected between said cathode electrode and said one tap, and said transistor is of the PNP type.

5. A carrier frequency telephone transmitting system comprising a source of speech signals, a source of carrier oscillations, a source of signalling oscillations, means for modulating said carrier oscillations with said speech signals, signalling generator means for modulating said carrier oscillations with said signalling oscillations, and means for combining the speech signal modulated carrier oscillations and the signalling oscillation modulated carrier oscillations to provide an output signal, said signalling generator comprising a transistor having emitter, base and collector electrodes, a source of bias voltage having a first terminal connected to a reference point and a second terminal, first resistive voltage divider means connected between said first and second terminals and having a first tap connected to said base electrode, second resistive voltage divider means connected between said first and second terminals and having a second tap connected to said emitter electrode and a third tap between said second tap and said first terminal, capacitor and variable resistor means serially-connected between said third tap and said emitter electrode, resistor means for applying said signalling oscillations to said emitter electrode, means for applying said carrier oscillations to said base electrode, output filter circuit means connected to said collector electrode, and impedance means and signalling switch means serially-connected between said reference point and one of said first and second taps whereby in one position of said switch said transistor is provided with bias for class B operation and in the other position of said switch said transistor is cut off.

6. A carrier frequency telephone transmitting system comprising a source of speech signals, a source of carrier oscillations, a source of signalling oscillations, means for modulating said carrier oscillations with said speech signals, signalling generator means for modulating said carrier oscillations with said signalling oscillations, and means for combining the speech signal modulated carrier oscillations and the signalling oscillation modulated carrier oscillations to provide an output signal, said signalling generator comprising a transistor having emitter, base and collector electrodes, a source of bias voltage having one terminal connected to a reference point and a second terminal, first and second resistive voltage dividers each connected between said first and second terminals, said first voltage divider having a tap connected to said base electrode, said second voltage divider having a tap connected to said emitter electrode, said voltage dividers providing bias for class B operation to said transistor, means for applying said signalling oscillations to said emitter electrode, means for applying said carrier oscillations to said collector electrode, output filter means connected to said collector electrode for deriving said signalling oscillation modulated carrier oscillations, and signalling switch means and impedance means serially-connected between said base electrode and reference point for selectively preventing conduction in said transistor.

7. A carrier frequency telephone transmitting system comprising a source of speech signals, a source of carrier oscillations, a source of signalling oscillations, means for modulating said carrier oscillations with said speech signals, signalling generator means for modulating said carrier oscillations with said signalling oscillations, and means for combining the speech signal modulated carrier oscillations and the signalling oscillation modulated carrier oscillations to provide an output signal, said signalling generator comprising a transistor having emitter, base and collector electrodes, a source of bias voltage having one terminal connected to a reference point and a second terminal, first and second resistive voltage dividers each connected between said first and second terminals, said first voltage divider having a tap connected to said base electrode, said second voltage divider having a tap connected to said emitter electrode, said voltage dividers providisg cut-off bias for said transistor, means for applying said signalling oscillations to said emitter electrode, means for applying said carrier oscillations to said base electrode, output filter means connected to said collector electrode for deriving said signalling oscillation modulated carrier oscillations, and signalling switch means and impedance means serially-connected between said emitter electrode and reference point for selectively providing class B operating bias for said transistor.

References Cited in the file of this patent

UNITED STATES PATENTS

| | | |
|---|---|---|
| 2,184,826 | Wiessner | Dec. 26, 1939 |
| 2,215,483 | Skillman | Sept. 24, 1940 |
| 2,871,295 | Stachiewicz | Jan. 27, 1959 |
| 2,880,312 | Koch | Mar. 21, 1959 |
| 2,891,145 | Bradmiller | June 16, 1959 |

FOREIGN PATENTS

| | | |
|---|---|---|
| 506,289 | Great Britain | May 25, 1939 |